United States Patent
Khoury

(10) Patent No.: US 10,939,356 B2
(45) Date of Patent: Mar. 2, 2021

(54) ACCESS-POINT DISCOVERY OF WIRELESS-NETWORK TOPOLOGY

(71) Applicant: ARRIS Enterprises LLC, Suwanee, GA (US)

(72) Inventor: Peter Khoury, San Francisco, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 35 days.

(21) Appl. No.: 16/148,118

(22) Filed: Oct. 1, 2018

(65) Prior Publication Data

US 2019/0104463 A1 Apr. 4, 2019

Related U.S. Application Data

(60) Provisional application No. 62/566,330, filed on Sep. 30, 2017.

(51) Int. Cl.
*H04W 40/24* (2009.01)
*H04B 17/318* (2015.01)
(Continued)

(52) U.S. Cl.
CPC ........ *H04W 40/246* (2013.01); *H04B 17/318* (2015.01); *H04L 41/12* (2013.01);
(Continued)

(58) Field of Classification Search
CPC .. H04B 17/318; H04W 40/246; H04W 16/18; H04W 8/005; H04W 48/14; H04W 76/11;
(Continued)

(56) References Cited

U.S. PATENT DOCUMENTS 6,580,700 B1 6/2003 Pinard
7,965,686 B1 6/2011 Bridge
(Continued)

FOREIGN PATENT DOCUMENTS

EP 3108694 B1 2/2018

OTHER PUBLICATIONS

PCT International Search Report & Written Opinion, Re: Application No. PCT/US2018/053814, dated Jan. 8, 2019.
(Continued)

*Primary Examiner* — Maharishi V Khirodhar
*Assistant Examiner* — Kenneth P Hunt
(74) *Attorney, Agent, or Firm* — Steven Stupp; Stewart Wiener

(57) ABSTRACT

During disclosed communication techniques, an electronic device may exchange information that specifies probe requests with one or more other electronic devices in the network. Then, the electronic device may aggregate information about the probe requests. Moreover, the electronic device may determine, based at least in part on the aggregated information, electronic device-to-electronic device connections in the network, such as connections among neighboring access points. Next, the electronic device may calculate, based at least in part on the aggregated information and the electronic device-to-electronic device connections, first transition thresholds between nearest-neighbor electronic devices in the network. Furthermore, the electronic device may select, based at least in part on the first transition thresholds, a response threshold. When the electronic device includes an access point, the electronic device may selectively respond to a probe request from a client based at least in part on the selected response threshold.

20 Claims, 5 Drawing Sheets

(51) Int. Cl.
  *H04L 12/24* (2006.01)
  *H04L 12/26* (2006.01)
  *H04W 16/18* (2009.01)
  *H04W 76/11* (2018.01)
  *H04W 8/00* (2009.01)
  *H04W 48/14* (2009.01)
  *H04W 24/02* (2009.01)
  *H04W 84/12* (2009.01)

(52) U.S. Cl.
  CPC ............ *H04L 43/16* (2013.01); *H04W 8/005* (2013.01); *H04W 16/18* (2013.01); *H04W 48/14* (2013.01); *H04W 76/11* (2018.02); *H04W 24/02* (2013.01); *H04W 84/12* (2013.01)

(58) Field of Classification Search
  CPC ...... H04W 84/12; H04W 24/02; H04L 41/12; H04L 43/16
  See application file for complete search history.

(56) References Cited

U.S. PATENT DOCUMENTS

| | | |
|---|---|---|
| 8,134,985 B2 | 3/2012 | Hong |
| 8,781,487 B2 | 7/2014 | Backes |
| 9,094,789 B2 | 7/2015 | Jeyaseelan |
| 9,161,293 B2 | 10/2015 | Choudhary |
| 9,807,813 B2 | 10/2017 | Hart et al. |
| 9,877,251 B2 | 1/2018 | Stager |
| 10,021,529 B2 | 7/2018 | Narasimhan |
| 10,034,300 B2 | 7/2018 | Rangarajan et al. |
| 2008/0080388 A1 | 4/2008 | Dean et al. |
| 2011/0307609 A1 | 12/2011 | Rangarajan et al. |
| 2012/0213159 A1 | 8/2012 | Iyer et al. |
| 2013/0077505 A1* | 3/2013 | Choudhary ........... H04W 48/14 370/252 |
| 2014/0126388 A1 | 5/2014 | Shin |
| 2014/0355589 A1 | 12/2014 | Yang et al. |
| 2015/0065126 A1 | 3/2015 | Jung ..................... H04W 48/16 |
| 2015/0282053 A1 | 10/2015 | Kneckt |
| 2015/0304942 A1 | 10/2015 | Wentink |
| 2016/0007278 A1 | 1/2016 | Gupta et al. |
| 2016/0112944 A1 | 4/2016 | Zhou |
| 2016/0227473 A1* | 8/2016 | Bhanage ............... H04W 16/00 |
| 2016/0255511 A1 | 9/2016 | Jeong et al. |
| 2016/0255661 A1 | 9/2016 | Siraj |
| 2016/0309537 A1 | 10/2016 | Hart et al. |
| 2016/0353492 A1 | 12/2016 | Park et al. |
| 2017/0171833 A1 | 6/2017 | Vamaraju |
| 2017/0272310 A1 | 9/2017 | Rengarajan et al. |
| 2018/0279130 A1 | 9/2018 | Huang |

OTHER PUBLICATIONS

Official Action, Re: U.S. Appl. No. 15/920,093, dated Apr. 1, 2019.

* cited by examiner

ACCESS-POINT DISCOVERY OF WIRELESS-NETWORK TOPOLOGY

CROSS REFERENCE TO RELATED APPLICATIONS

This application claims priority under 35 U.S.C. 119(e) to U.S. Provisional Application Ser. No. 62/566,330, entitled "Access-Point Discovery of Wireless-Network Topology," by Peter Khoury, filed on Sep. 30, 2017, the contents of which are herein incorporated by reference.

BACKGROUND

Field

The described embodiments relate to techniques for discovering or determining a network topology in a wireless local area network (WLAN).

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In a wireless network based on an IEEE 802.11 standard, an electronic device often actively scans for a nearby operating access point by transmitting a probe request. In response to receiving a probe request, an access point typically transmits a probe response. However, the electronic device may systematically scan the channels in one or more frequency bands. Consequently, the electronic device may transmit multiple probe requests in a 2.4 GHz and/or a 5 GHz frequency band. In addition, the electronic device may also send probe requests in the channels in one or more frequency bands for the saved profiles that are stored on the electronic device, such as, e.g., multiple basic service set identifiers (BSSIDs) of access points, as well as broadcast probe request. Therefore, the electronic device may regularly send bursts of probe requests to the access point. Moreover, the access point usually transmits numerous probe responses based on these probe requests, which can result in significant overhead in the wireless network and reduced communication performance.

SUMMARY

The described embodiment relates to an electronic device (such as an access point, a server or a controller). This electronic device includes an interface circuit that wirelessly communicates with one or more other electronic devices (such as one or more other access points) and one or more clients in a network. During operation, the electronic device exchanges, via the interface circuit, information that specifies probe requests with the one or more other electronic devices in a network, such as one or more neighboring access points (or a controller). Then, the electronic device may aggregate information about the probe requests associated with the one or more clients in the network. Moreover, the electronic device determines, based at least in part on the aggregated information, electronic device-to-electronic device connections in the network, such as connections among the neighboring access points. Next, the electronic device calculates, based at least in part on the aggregated information and the electronic device-to-electronic device connections, one or more first transition thresholds between nearest-neighbor electronic devices in the network. Furthermore, the electronic device selects a response threshold for whether to respond to a given probe request, a given authentication frame or a given management frame based at least in part on the one or more first transition thresholds.

Moreover, the electronic device may calculate, based at least in part on the aggregated information and the electronic device-to-electronic device connections, one or more second transition thresholds between next-nearest-neighbor electronic devices in the network.

Furthermore, the selected response threshold may be based at least in part on the one or more second transition thresholds.

Additionally, where the electronic device is an access point, the electronic device may selectively respond, based at least in part on the selected response threshold, to a probe request from a client in the one or more clients in the network. In some embodiments, the electronic device may selectively respond, based at least in part on the selected response threshold, to an authentication frame or a management frame.

Note that aggregating the information about the probe requests may involve the electronic device: collecting the probe requests and associated client identifiers of the one or more clients (such as a media access control or MAC address), as well as times of receipt and signal strengths (such as received signal strength indicators); and, based at least in part on the times of receipt and the client identifiers, clustering or grouping the probe requests from the one or more clients, where a given cluster includes the probe requests associated with a given client identifier that were transmitted in a time interval (such as within minutes, hours or days of each other).

Moreover, by determining the electronic device-to-electronic device connections, the electronic device may infer a network topology of the network based at least in part on signal strengths of different clusters of probe requests that were received across multiple channels by the electronic device and the one or more other electronic devices.

Furthermore, determining the electronic device-to-electronic device connections in the network may involve computing, based at least in part on the aggregated information, which of the electronic device and the one or more other electronic devices are neighbors to each other (such as nearest neighbors or next nearest neighbors) as seen from the perspective of a given client in the one or more clients in the network. For example, computing which of the electronic device and the one or more other electronic devices are neighbors may be based at least in part on a signal-strength order from the perspective of a given client in the aggregated information. Notably, the computing may involve computing a first probability that the electronic device has a strongest signal from the perspective of a given client and that a given other electronic device in the one or more other electronic devices has a second strongest signal from the perspective of the given client, where, in the first probability, that the electronic device has the strongest signal from the perspective of the given client and that the given other electronic device in the one or more other electronic devices has the second strongest signal from the perspective of the given client are treated as if they are independent events, and a joint probability that the electronic device has the strongest signal from the perspective of a given client and the given other electronic device has the second strongest signal from the perspective of a given client. When the joint probability is greater than the first probability, the electronic device and the given other electronic device may be neighbors in the network from the perspective of the given client in the network. Alternatively, the computing may involve identifying pairs of electronic devices in the electronic device and the one or more other electronic devices that have a strongest signal from the perspective of a given client in the aggregated information.

Additionally, the one or more first transition thresholds may be signal-strength thresholds between the nearest-neighbor electronic devices in the network.

In some embodiments, the response threshold includes at least one of the one or more first transition thresholds or a combination of the one or more first transition thresholds.

Moreover, in some embodiments, one of the first transition thresholds, one of the second transition thresholds, or the selected response threshold may be used to recommend a transition between access points in the network. For example, the response threshold may be used as roaming threshold to determine when the electronic device should message a client to suggest that it transition or roaming to another access point.

Another embodiment provides a computer-readable storage medium for use with the electronic device. This computer-readable storage medium may include program instructions that, when executed by the electronic device, causes the electronic device to perform at least some of the aforementioned operations.

Another embodiment provides a method for determining a Wi-Fi network topology. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
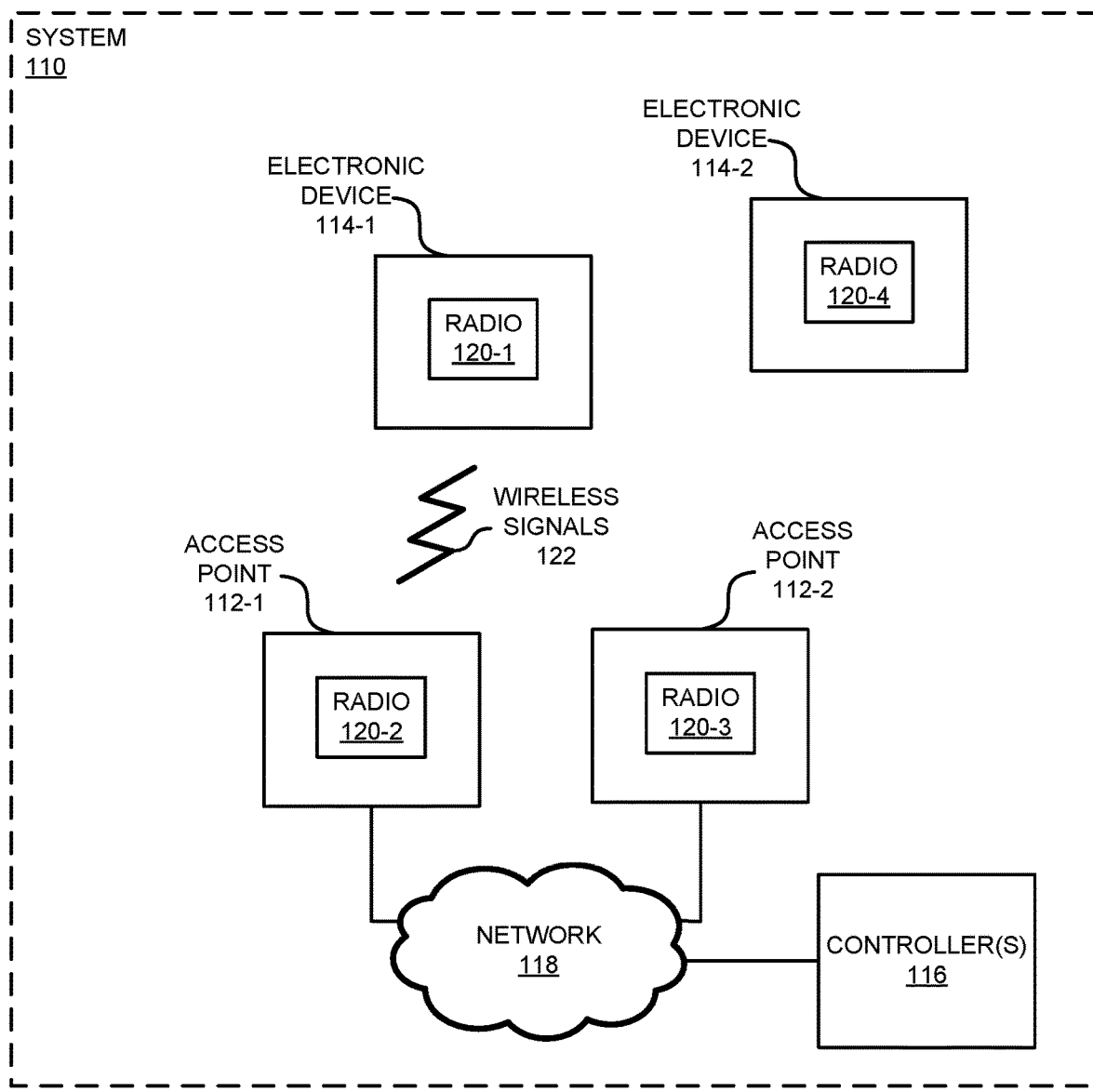
FIG. 1 is a block diagram illustrating an example of a system in accordance with an embodiment of the present disclosure.

Communication techniques are described. During the communication techniques, an electronic device (such as an access point, a server or a controller) may exchange information about probe requests with one or more other electronic devices in a network, such as one or more neighboring access points. Then, the electronic device may aggregate or collect information about the probe requests (which are sometimes referred to as 'scans of probe requests') associated with one or more clients in the network. Moreover, the electronic device may determine, based at least in part on the aggregated information, electronic device-to-electronic device connections in the network, such as connections among neighboring access points. Next, the electronic device may calculate, based at least in part on the aggregated information and the electronic device-to-electronic device connections, one or more first transition thresholds between nearest-neighbor electronic devices in the network. Furthermore, the electronic device may optionally calculate one or more second transition thresholds between next-nearest-neighbor electronic devices in the network. Additionally, the electronic device may select a response threshold for whether to respond to a probe request, an authentication frame or a management frame. For example, the selected response threshold may be based at least in part on the one or more first transition thresholds and the one or more second transition thresholds.

By determining the network topology and the appropriate response thresholds in a WLAN (and, more generally, in a venue or a deployment), the communication techniques may improve the communication performance of the WLAN. For example, in embodiments where the electronic device is an access point, the electronic device may selectively respond, based at least in part on the selected response threshold, to a probe request from a client (such as a cellular telephone) in the one or more clients in the network, thereby reducing management traffic in the network. Alternatively or additionally, using the communication techniques, the access point may be able to selectively recommend roaming transitions. Furthermore, the communication techniques may increase the probability or likelihood that a client will connect to the access point with the strongest connection because only the strongest access point(s) may respond to probe requests from the client. Consequently, the communication techniques may improve the user experience and customer satisfaction of users of the electronic device and/or the one or more other electronic devices.

In the discussion that follows, electronic devices or components in a system communicate packets or frames in accordance with a wireless communication protocol, such as: a wireless communication protocol that is compatible with an IEEE 802.11 standard (which is sometimes referred to as 'Wi-Fi®' from the Wi-Fi Alliance of Austin, Tex.), Bluetooth (from the Bluetooth Special Interest Group of Kirkland, Wash.), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

We now describe some embodiments of the communication techniques. FIG. 1 presents a block diagram illustrating an example of a system 110, which may include components, such as: one or more access points 112, one or more electronic devices 114 (such as cellular telephones, stations, another type of electronic device, etc., which are sometimes referred to as 'clients'), and one or more optional controllers 116. In system 110, the one or more access points 112 may wirelessly communicate with the one or more electronic devices 114 using wireless communication that is compatible with an IEEE 802.11 standard. Thus, the wireless communication may occur in, e.g., a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). Note that the one or more optional controllers 116 may be at the same location as the other components in system 110 or may be located remotely (i.e., at a different location). Moreover, note that the one or more access points 112 may be configured and/or managed by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 5:
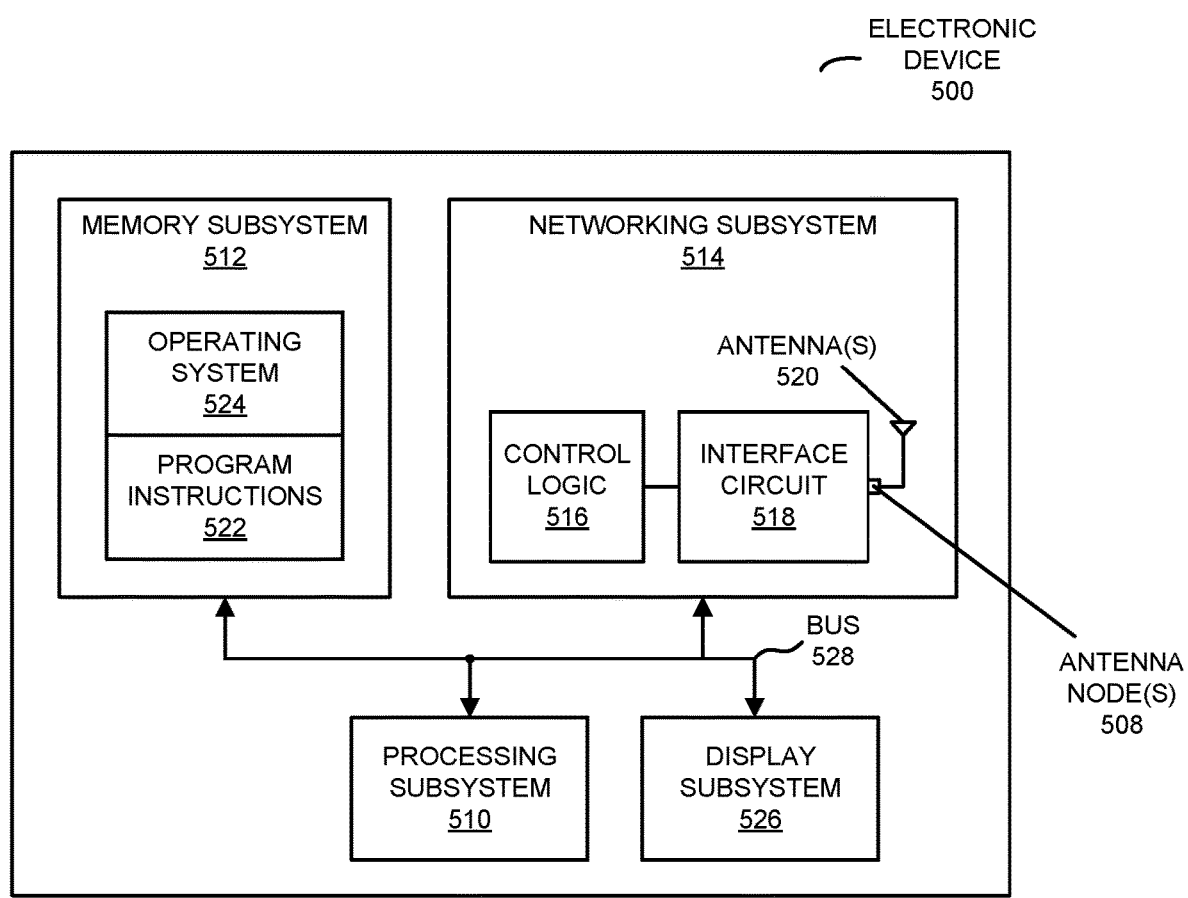
FIG. 5 is a block diagram illustrating an example of an electronic device in accordance with an embodiment of the present disclosure.

As described further below with reference to FIG. 5, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal strength (such as a received signal strength indicator or RSSI), a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

In the communication techniques, one or more of access points 112 (such as access point 112-1) may discover or determine a Wi-Fi network topology as seen by a client, such as one of electronic devices 114 (e.g., electronic device 114-1). Notably, access point 112-1 may exchange information specifying the probe requests with neighboring access points. For example, when looking for Wi-fi networks or an access point with improved communication performance, electronic devices 114 may perform a network scan in which they transmit a series of probe requests on various channels in quick succession. Access points 112 may gather information about the media access control (MAC) address of electronic device 114-1 (or other identifying information), the time of receipt, and the signal strength. Access point 112-1 may then exchange this information either with its neighbors or a central data structure (such as in one of controllers 116) depending on whether the communication techniques are implemented in a distributed or a centralized manner.

Using a centralized implementation as an illustrative example (although a distributed implementation in one or more of access points 112 may be used). one or more of optional controllers may collect or aggregate information about the scans of probe requests. For example, time of receipt and an electronic-device identifier may be used to cluster/group probe requests that were transmitted at very close to the same time from the same electronic device, such as electronic device 114-1. This clustering may allow a network-topology discovery technique to generate scan samples of how a signal from electronic device 114-1 is received by multiple access points 112 across multiple channels. In a dense network where the communication techniques are particularly useful, there may be hundreds and thousands of these correlated probe requests or scan-samples over a period of minutes, hours, or days, which can be used for network-topology discovery.

Then, access point-to-access point connections or neighboring access points may be determined. In this operation, one or more of controllers 116 (or one of access points 112) may determine which access points are neighbors to each other as seen from the perspective of electronic device 114. This may be performed in a variety of ways. For example, one approach involves comparing a joint probability with the first probability. In some embodiments, the likelihood that a particular access point is the access point with the strongest signal from the perspective of electronic device 114 and another access point is the second strongest signal from the perspective of electronic device 114 is determined. Notably, this probability may be determined for each access point independently and as a joint probability (i.e., the first probability that the electronic device has a strongest signal from the perspective of electronic device 114 and that a given other electronic device in the one or more other electronic devices has a second strongest signal from the perspective of electronic device 114, and the joint probability that the electronic device has a strongest signal from the perspective of electronic device 114 and that a given other electronic device in the one or more other electronic devices has a second strongest signal from the perspective of electronic device 114). If the joint probability is higher than the first probability would predict, then the two access points are neighbors from the point of view of the electronic-device network topology.

In some embodiments, the neighboring access points may be determined by using signal-strength information (such as RSSIs) instead of the signal-strength order. In this approach, neighboring access points are identified using the joint probability relative to the first probability based on the signals from the scan samples.

Figure 2:
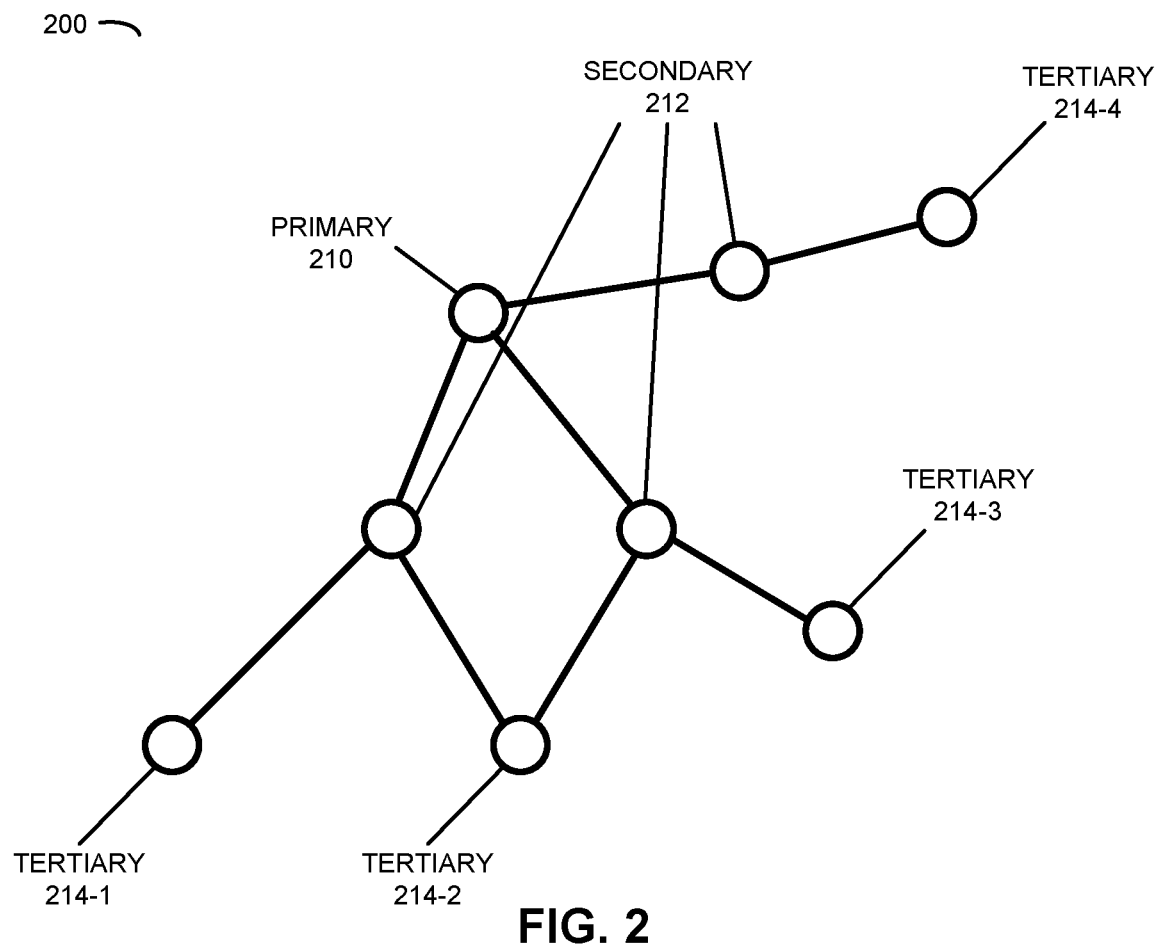
FIG. 2 is a block diagram illustrating an example of a wireless network having a topology in the system of FIG. 1 in accordance with an embodiment of the present disclosure.

As illustrated in FIG. 2, which presents a block diagram illustrating an example of a wireless network 200 having a topology in system 110 (FIG. 1), based at least in part on the connections a network graph can be drawn with lines connecting access points 112 with joint probabilities that are higher than the first probabilities. This network graph and its topology can be used to determine which access points 112 are secondary 212 for a given primary 210 access point (such as the direct neighbors of access point 112-1, which are sometimes referred to as 'nearest neighbors' or 'secondary neighbors'). The network graph can also be used to determine which access points 112 are tertiary 214 to a given primary access point (which are sometimes referred to as 'next nearest neighbors' or 'tertiary neighbors'). Note that tertiary access points will be a direct neighbor of a direct neighbor of the primary access points without being the secondary access point or the primary access point.

Returning to FIG. 1, next a first transition threshold from a primary access point to a secondary access point are determined. Notably, scan samples may be used to determine signal strength thresholds that bound electronic-device transitions from a primary access point to a secondary access point. Note that in a previous operation the neighboring access points were determined.

For secondary boundary discovery, the scan samples that the primary access point shares with its secondary neighbors may be determined. In the shared scan sample, the primary access point may have the strongest signal or the second strongest signal (and, more generally, the $N^{th}$ strongest signal, where N is an integer) and one of the secondary access points may have the strongest signal or the second strongest signal (and, more generally, the $M^{th}$ strongest signal, where M is an integer). Notably, two distributions may be calculated. The first distribution may be based at least in part on scan samples in which one of the secondary neighbors has a stronger signal than the primary access point. Moreover, the second distribution may be based at least in part on scan samples in which the primary access point has a stronger signal than any of the secondary access points.

An upper bound of the first transition threshold may be based at least in part on the upper end of the first distribution. In an ideal network, the maximum value of the first distribution may be computed and this may be used as the highest signal strength at which a secondary access point may be better than the primary access point. In practice, because data collection is often imperfect, a percentile may be used, such as the $70^{th}$, $80^{th}$ or $90^{th}$ percentile.

Note that a lower bound of the first transition threshold may be based at least in part on a lower end of the second distribution. In an ideal network, the minimum may be computed. However, once again, in practice the $5^{th}$, $10^{th}$ or $20^{th}$ percentile may be used. This threshold may probabilistically approximate the lowest signal strength at which the primary access point is stronger than any of the secondary access points.

Furthermore, a second transition threshold from the primary access point to a tertiary access point may be determined. Notably, scan samples similar to those described above may be used to determine primary-to-tertiary signal strength thresholds. In the previous operations, access point that are neighbors are determined. Tertiary access points are access points that are neighbors of the neighbors of a primary access point without being secondary access points or the primary access points.

For tertiary boundary discovery, the scan samples that the primary access point shares with its secondary and tertiary neighbors may be used. Notably, the scan samples may be those in which the signal strength at the secondary access point is stronger than any other access point. Then, for these scan samples, the scan samples where the primary access points is ranked $2^{nd}$ in signal strength and where the tertiary access point is ranked $3^{rd}$, or where the tertiary access point is ranked $2^{nd}$ and the primary is ranked $3^{rd}$ may be determined. Once again, two distributions may be computed.

The first distribution may be based at least in part on the scan samples in which one of the tertiary neighbors have a stronger signal than the primary access point. Moreover, the second distribution may be based at least in part on the scan samples in which the primary access point has a stronger signal than any of the tertiary access points.

The upper bound of the second transition threshold may be based at least in part on the upper end of the first distribution. In an ideal network, the maximum value of the first distribution may be calculated and may be used as the highest signal strength at which a tertiary access point may be better than the primary access point if the secondary access point was not present. In practice, because data collection is often imperfect, a percentile may be used, such as the $70^{th}$, $80^{th}$ or $90^{th}$ percentile.

The lower bound of the second transition threshold may be based at least in part on the lower end of the second distribution. In an ideal network, the minimum may be computed. Once again, in practice the $5^{th}$, $10^{th}$ or $20^{th}$ percentile may be used. This threshold may probabilistically approximate the lowest signal strength at which the primary access point is stronger than any of the tertiary access points if none of the secondary access points were present.

Additionally, one of the transition thresholds or a combination of the transition thresholds may be used to set a probe, authentication and/or a management frame rejection threshold (which is sometimes referred to as a 'response threshold'). For example, the lower bound of the tertiary boundary may be used to set a threshold (such as a signal strength threshold) below which access point 112-1 does not generate a probe response for electronic device 114-1. These transition thresholds can also be used for roaming. For example, a primary-to-secondary transition may be used to determine when to send a message to a client that it should consider roaming. Alternatively, a secondary-to-tertiary boundary may be used to determine when to send a message that the client should roam.

The communication techniques may provide or facilitate easy discovery of cross-channel information by exploiting existing electronic-device behavior. Many access-point vendors use complicated techniques to discover information about neighboring access points and the network across Wi-Fi channels. For example, access points may use a technique, which is sometimes referred to as 'off-channel scanning,' in which an access point interrupts its normal operation to change channels and examine radio-frequency characteristics on another channel. In contrast, the described communication techniques may use topological discovery based at least in part on existing electronic-device behavior and scanning to enable an access point to determine connections and electronic-device signal strengths across Wi-Fi channels. This behavior can be exploited by a network optimization technique to allow adjacent access points that may be operating on different channels to have information about how close they are to each other without changing channels (and, more generally, without interrupting normal operation or changing channels).

The determined network topology may represent the real electronic-device experience, as opposed to an approximation generated based at least in part on access-point data. Many techniques and most topological data used by access-point vendors often solely consider the perspective of an access point because that is the easiest data to collect. Access points can easily listen to signals from other access points. For example, access points are often mounted on ceilings and, thus, can hear each other more easily than electronic devices 114 can hear those same access points. Notably, an access point may currently generate a neighbor list by listening for its neighbors, but because its mounted in a favorable radio-frequency position it may hear many more neighbors than any of the electronic devices connected to it. A network topology created based at least in part on how strongly each access point hears other access points is not the same and can be significantly different from how electronic devices hear each access point. The better a network topology reflects the reality of electronic device 114-1, the better the network can serve electronic device 114-1.

In some embodiments, the neighbor discovery in the communication techniques reduces a neighbor list from 8-10 to a more realistic 3 or 4.

Because information is exchanged between access points in the communication techniques, it may allow for a more accurate setting of thresholds than a technique that is executed on a single access point. Notably, the communication techniques may reduce the likelihood that the response threshold is set too high and that an electronic device would not be able to connect to the network. Thus, the communication techniques may ensure that the electronic devices are not inadvertently stranded. Moreover, the communication techniques may reduce the likelihood that the response threshold is set too low and that too many probe responses are sent. In the communication techniques, the thresholds may be defined per access point instead of across a network, which may further improve the communication performance in the network.

Thus, the communication techniques may allow cell boundaries and thresholds to be set autonomously (e.g., with minimal or no manual configuration) with a custom signal strength for each access point. Moreover, the communication techniques may allow a range of thresholds from a secondary to a tertiary or beyond to be set depending on whether aggressive suppression or weak suppression is desired. Furthermore, the communication techniques may reduce management traffic in the network because there are fewer probe responses. Additionally, the communication techniques may push or steer an electronic device to connect to one of the best access points because only the strongest access points may respond to probe requests from the electronic device.

In this way, the communication techniques may allow one or more of access points 112 to determine a wireless-network topology and the response threshold. This may allow the communication performance in system 110 to be improved.

Note that the determined thresholds, individually or jointly, can also be used to determine when to transmit messages, which are compatible with IEEE 802.11v, that indicate to a client when it is likely closer to another access point than the access point to which the client is currently connected or associated.

In the described embodiments, processing a frame or a packet in the one or more electronic devices 114 and/or the one or more access points 112 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114, and/or the one or more optional controllers 116. As another example, in another embodiment, different electronic devices are transmitting and/or receiving frames or packets.

Figure 3:
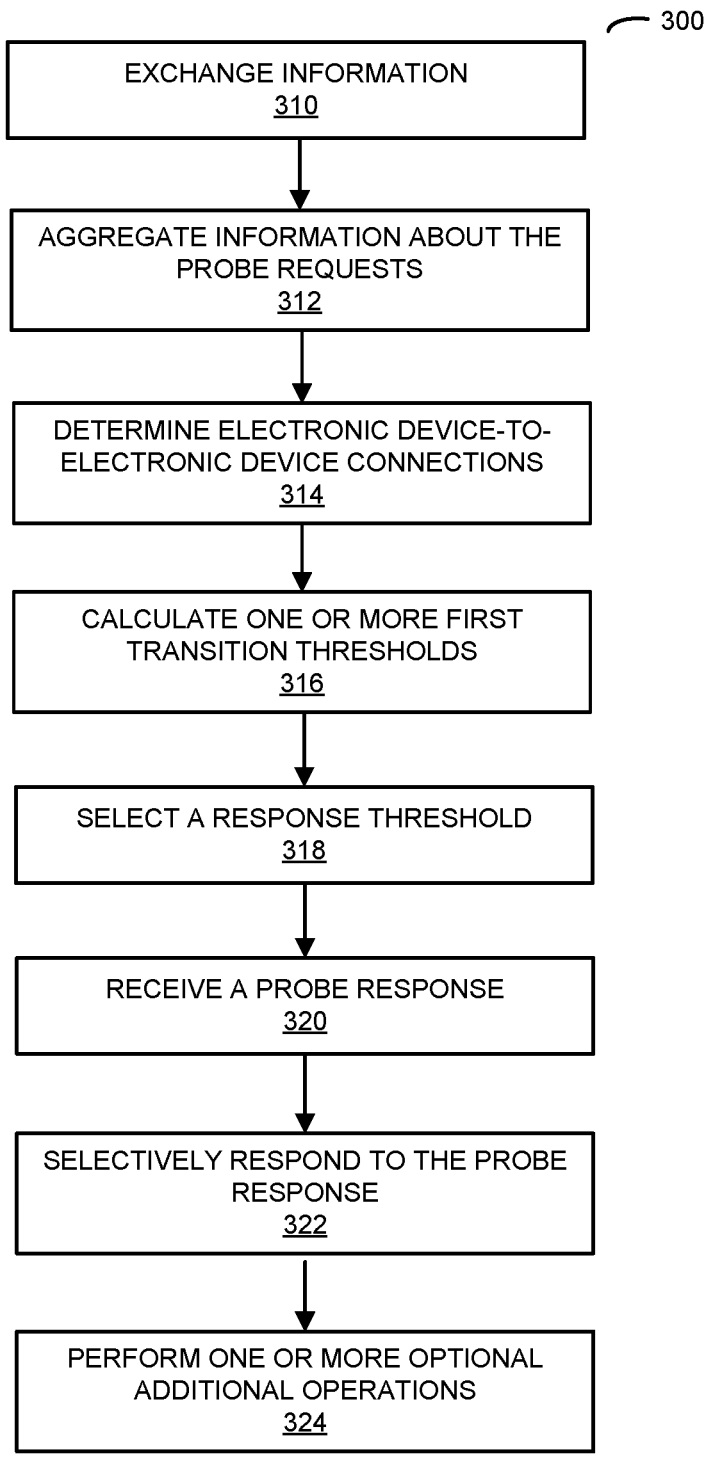
FIG. 3 is a flow diagram illustrating an example method for determining a Wi-Fi network topology in the system in FIG. 1 in accordance with an embodiment of the present disclosure.

FIG. 3 presents a flow diagram illustrating an example method 300 for determining a Wi-Fi network topology. Moreover, method 300 may be performed by an electronic device, such as one of the one or more access points 112 or one of the one or more optional controllers 116 in FIG. 1. During operation, the electronic device may exchange information (operation 310) that specifies probe requests with one or more other electronic devices in a network, such as one or more neighboring access points (or a controller).

Then, the electronic device may aggregate information about the probe requests (operation 312) associated with one or more clients in the network. For example, the electronic device may aggregate information about the probe requests received over a period of milliseconds or seconds (because a client will not move very much over this time scale). This aggregation may generate data that spans multiple access point. Note that the aggregated information may be gathered over a period of hours up to days, until the electronic device has collected sufficient data to achieve statistically significance.

Moreover, the electronic device may determine, based at least in part on the aggregated information, electronic device-to-electronic device connections (operation 314) in the network, such as connections among the neighboring access points. For example, the aggregated information about probe requests for a particular client may be arranged in entries corresponding to particular receipt times or time intervals across one or more access points. After this grouping, the RSSIs associated with the probe requests received by different access points at the same time or within a common time interval (such as a few seconds) may be used to determine the electronic device-to-electronic device connections (and, thus, as the network topology).

Next, the electronic device may calculate, based at least in part on the aggregated information and the electronic device-to-electronic device connections, one or more first transition thresholds (operation 316) between nearest-neighbor electronic devices in the network.

Furthermore, the electronic device may select a response threshold (operation 318) for whether to respond to a given probe request, a given authentication frame or a given management frame based at least in part on the one or more first transition thresholds. In some embodiments, the response threshold includes at least one of the one or more first transition thresholds or a combination of the one or more first transition thresholds.

Additionally, the electronic device (such as an access point) may receive (operation 320) and may selectively respond, based at least in part on the selected response threshold, to a probe request (operation 322) from a client in the one or more clients in the network.

In some embodiments, the electronic device may perform one or more optional operations (operation 324). For example, the electronic device may receive and may selectively respond, based at least in part on the selected response threshold, to an authentication frame or a management frame. Alternatively or additionally, the electronic device may provide, based at least in part on the one of the transition thresholds or the response threshold, a recommendation to a client to transition from a current association with an access point to an association with another access point. For example, the recommendation may be based at least in part on a signal or signal strength of the client (such as an RSSI) relative to the selected response threshold.

Moreover, the electronic device may calculate, based at least in part on the aggregated information and the electronic device-to-electronic device connections, one or more second transition thresholds between next-nearest-neighbor electronic devices in the network. Furthermore, in some embodiments, the selected response threshold may be based at least in part on the one or more second transition thresholds.

Note that aggregating the information about the probe requests (operation 310) may involve the electronic device: collecting the probe requests and associated client identifiers of the one or more clients (such as a media access control or MAC address), as well as times of receipt and signal strengths (such as RSSIs); and, based at least in part on the times of receipt and the client identifiers, clustering or grouping the probe requests from the one or more clients, where a given cluster includes the probe requests associated with a given client identifier that were transmitted in a time interval (such as within minutes, hours or days of each other).

Moreover, by determining the electronic device-to-electronic device connections (operation 314), the electronic device may infer a network topology of the network based at least in part on the signal strengths of different clusters of probe requests that were received across multiple channels by the electronic device and the one or more other electronic devices.

Furthermore, determining the electronic device-to-electronic device connections (operation 314) in the network may involve computing, based at least in part on the aggregated information, which of the electronic device and the one or more other electronic devices are neighbors to each other (such as nearest neighbors or next nearest neighbors) as seen from the perspective of a given client in the one or more clients in the network. For example, computing which of the electronic device and the one or more other electronic devices are neighbors may be based at least in part on a signal-strength order from the perspective of a given client in the aggregated information. Notably, the computing may involve computing the first probability that the electronic device has the strongest signal from the perspective of the given client and that the given other electronic device in the one or more other electronic devices has the second strongest signal from the perspective of the given client, and a joint probability that the electronic device has the strongest signal from the perspective of a given client and the given other electronic device has the second strongest signal from the perspective of a given client. When the joint probability is greater than the first probability, the electronic device and the given other electronic device may be neighbors in the network from the perspective of the given client in the network. Alternatively, the computing may involve identifying pairs of electronic devices in the electronic device and the one or more other electronic devices that have a strongest signal from the perspective of a given client in the aggregated information.

Additionally, the one or more first transition thresholds may be signal-strength thresholds between the nearest-neighbor electronic devices in the network.

Moreover, the electronic device may receive one or more probe requests prior to exchanging the information (operation 310).

In some embodiments of method 300, there may be additional or fewer operations. Moreover, there may be one or more different operations. Furthermore, the order of the operations may be changed, and/or two or more operations may be combined into a single operation.

Figure 4:
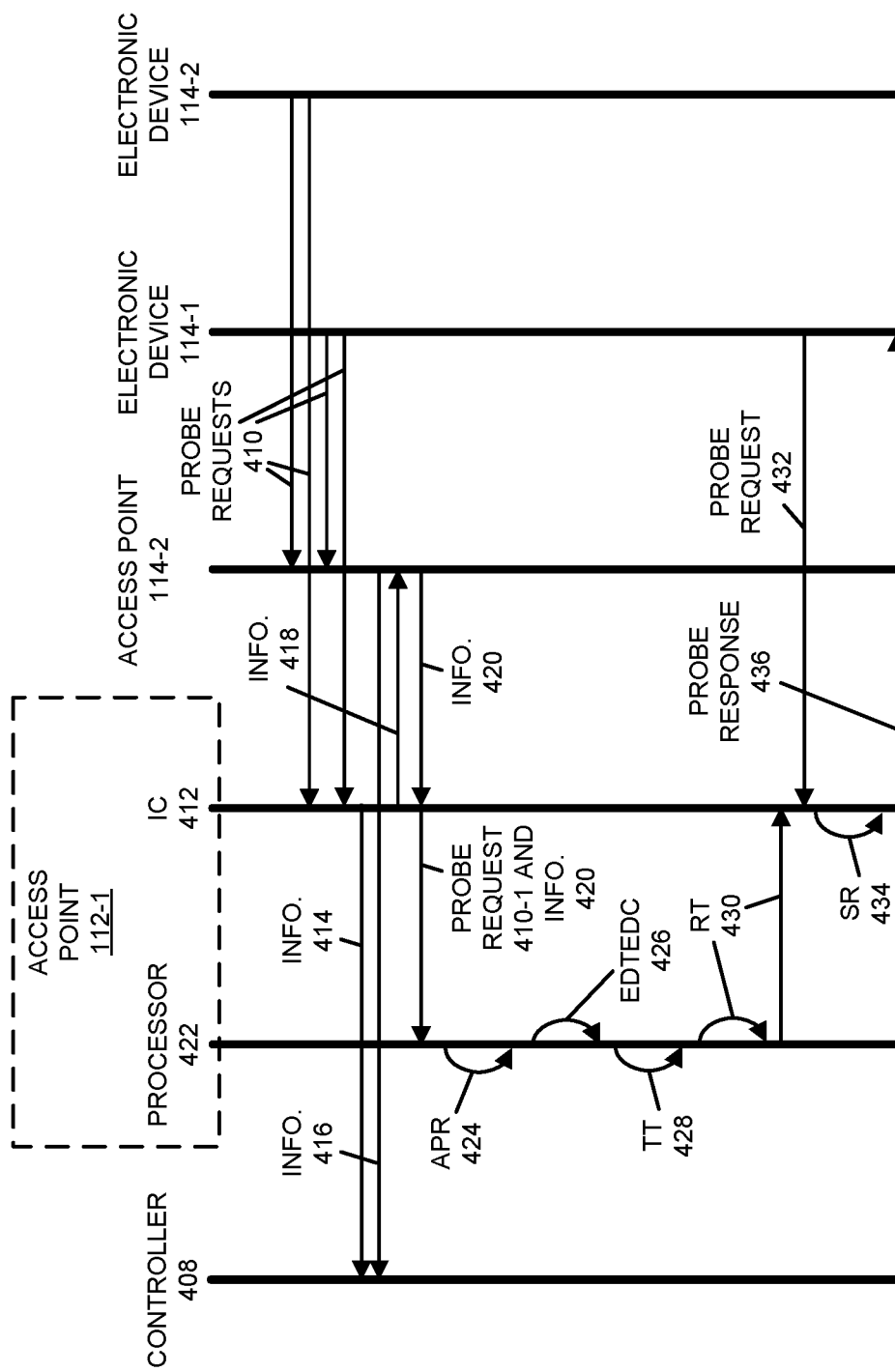
FIG. 4 is a drawing illustrating an example of communication among electronic devices in FIG. 1 in accordance with an embodiment of the present disclosure.

FIG. 4 presents a drawing illustrating an example of communication among electronic devices 114, access points 112 and a controller 410 (such as one of the one or more optional controllers 116 in FIG. 1). In FIG. 4, electronic devices 114 may provide probe requests 410. These probe requests may be received by access points 112, such as by interface circuit 412 in access points 112-1. While not shown in FIG. 4, access points 112 may provide probe responses in response to probe requests 410.

In embodiments where the communication techniques are implemented centrally, information 414 specifying probe requests 410 may be sent to controller 408. Similar information 416 may be received from access point 112-2. Then, controller 408 may perform at least some of the operations in the communication technique, and may provide response thresholds to access points 112. Alternatively, when the communication techniques are implemented in a distributed manner, each of access points 112 may perform an instance of at least some of the operations in the communication technique. In the discussion that follows, operations performed by access point 112-1 are used as an illustration of the communication techniques.

After receiving probe requests 410, interface circuit 412 may provide information 418 that specifies probe requests 410 to access point 412-2. Moreover, access point 112-2 may provide (via wired or wireless communication) information 420 that specifies probe requests received by access point 112-2 to access point 112-1. Furthermore, interface circuit 412 may provide probe requests 410-1 and information 420 to processor 422. Then, processor 422 may aggregate information about probe requests (APR) 424 associated with electronic devices 114 (i.e., the clients in a network).

Based at least in part on the aggregated probe requests 424, processor 422 may determine electronic device-to-electronic device connections (EDTEDC) 426 in the network, such as connections among the neighboring access points (e.g., access points 112-1 and 112-2).

Next, processor 422 may calculate, based at least in part on aggregated probe requests 424 and the electronic device-to-electronic device connections 426, one or more transition thresholds (TT) 428 between nearest-neighbor electronic devices in the network (such as access points 112-1 and 112-2).

Furthermore, processor 422 may select a response threshold 430 for whether to respond to a given probe request, a given authentication frame or a given management frame based at least in part on the one or more transition thresholds 428. Then, processor 422 may provide response threshold 430 to interface circuit 412.

Additionally, electronic device 114-1 may provide probe request 432 to access point 112-1. After receiving probe request 432, interface circuit 412 may determine a selective response (SR) 434 to probe request 430 based at least in part on response threshold 430. For example, based at least in part on response threshold 430, interface circuit 412 may determine that access point 112-2 is closer to electronic device 114-1 and may have more available capacity than access point 112-1 (which may be based at least in part on communication-performance information exchanged among access points 112). Consequently, interface circuit 412 may selectively determine not to provide a probe response to electronic device 114-1 in response to probe request 432. Alternatively, interface circuit 412 may determine that access point 112-1 is closer to electronic device 114-1 and may have more available capacity than access point 112-2 (which may be based at least in part on communication-performance information exchanged among access points 112). Consequently, interface circuit 412 may selectively determine to provide a probe response 436 to electronic device 114-1 in response to probe request 432.

While FIG. 4 illustrates communication between components and/or between access point 112-1 and electronic device 114-1 using single-ended or double-sided arrows corresponding, respectively, to unilateral or bilateral communication, in general a given communication operation may involve unilateral or bilateral communication.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 5 presents a block diagram illustrating an example of an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, graphical processor units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory (which collectively or individually are sometimes referred to as a 'computer-readable storage medium'). In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, networking subsystem 514 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 500 may be adapted or changed using pattern shapers (such as reflectors) in one or more antennas 520 (or antenna elements), which can be independently and selectively electrically coupled to ground to steer the transmit antenna radiation pattern in different directions. Thus, if one or more antennas 520 includes N antenna-radiation-pattern shapers, the one or more antennas 520 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting frames and/or scanning for frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, an access point, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 are included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

While the preceding discussion illustrated the communication techniques using communication in particular bands of frequencies, other bands of frequencies may be used, such as bands of frequencies corresponding to Long Term Evolution (LTE) and/or Citizen Band Radio Service (CBRS).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    an antenna; and
    an interface circuit, coupled to the antenna, configured to wirelessly communicate with one or more other electronic devices and one or more clients in a network, wherein the electronic device is configured to perform one or more operations comprising:
        exchanging, via the interface circuit, information that specifies probe requests with the one or more other electronic devices in a network;
        aggregating information about the probe requests associated with the one or more clients in the network;
        determining, based at least in part on the aggregated information, electronic device-to-electronic device connections in the network;
        calculating, based at least in part on the aggregated information and the electronic device-to-electronic device connections, one or more first transition thresholds between nearest-neighbor electronic devices in the network and one or more second transition thresholds between next-nearest-neighbor electronic devices in the network;
        selecting a response threshold for whether to respond to a given probe request, a given authentication frame or a given management frame based at least in part on the one or more first transition thresholds;
        receiving, at the interface circuit, a probe request, an authentication frame or a management frame associated with a client, wherein the probe request, the authentication frame or the management frame is compatible with an Institute of Electrical and Electronics Engineers (IEEE) 802.11 communication protocol, wherein the management frame comprises an association request, and wherein the probe request, the authentication frame or the management frame is received before the electronic device is associated with the client; and
        selectively responding, based at least in part on the selected response threshold, to the probe request, the authentication frame or the management frame.

2. The electronic device of claim 1, wherein the selected response threshold is based at least in part on the one or more second transition thresholds.

3. The electronic device of claim 1, wherein aggregating the information comprises:
    collecting the probe requests, client identifiers of the one or more clients associated with the probe requests, times of receipt of the probe requests, and signal strengths associated with the probe requests; and
    clustering or grouping the probe requests from the one or more clients based at least in part on the client identifiers and the times of receipt, wherein a given cluster comprises the probe requests associated with a given client identifier that were transmitted in a time interval.

4. The electronic device of claim 3, wherein a given client identifier comprises a media access control (MAC) address.

5. The electronic device of claim 1, wherein the one or more operations comprise inferring a network topology of the network based at least in part on the electronic device-to-electronic device connections, and signal strengths of different clusters of probe requests that were received across multiple channels by the electronic device and the one or more other electronic devices.

6. The electronic device of claim 1, wherein determining the electronic device-to-electronic device connections in the network comprises computing, based at least in part on the aggregated information, which of the electronic device and the one or more other electronic devices are neighbors to each other as seen from the perspective of a given client in the one or more clients in the network.

7. The electronic device of claim 6, wherein computing which of the electronic device and the one or more other electronic devices are neighbors is based at least in part on a signal-strength order in the aggregated information.

8. The electronic device of claim 6, wherein computing which of the electronic device and the one or more other electronic devices are neighbors comprises comparing a first probability that: the electronic device has a strongest signal, and that a given other electronic device in the one or more other electronic devices has a second strongest signal, and a joint probability that: the electronic device has the strongest signal, and that the given other electronic device has the second strongest signal
    wherein, in the first probability, that the electronic device has the strongest signal from the perspective of the given client and that the given other electronic device in the one or more other electronic devices has the second strongest signal from the perspective of the given client are treated as if they are independent events; and
    wherein, when the joint probability is greater than the first probability, the electronic device and the given other electronic device are neighbors in the network from the perspective of the given client in the network.

9. The electronic device of claim 6, wherein computing which of the electronic device and the one or more other electronic devices are neighbors comprises identifying pairs of electronic devices in the electronic device and the one or more other electronic devices that have a strongest signal in the aggregated information.

10. The electronic device of claim 1, wherein the one or more first transition thresholds comprise signal-strength thresholds between the nearest-neighbor electronic devices in the network.

11. The electronic device of claim 1, wherein the response threshold comprises at least one of the one or more first transition thresholds or a combination of the one or more first transition thresholds.

12. A non-transitory computer-readable storage medium for use in conjunction with an electronic device, the computer-readable storage medium storing program instructions, wherein, when executed by the electronic device, the program instructions cause the electronic device to perform one or more operations comprising:
    exchanging, via an interface circuit in the electronic device, information that specifies probe requests with one or more other electronic devices in a network;
    aggregating information about the probe requests associated with one or more clients in the network;
    determining, based at least in part on the aggregated information, electronic device-to-electronic device connections in the network;
    calculating, based at least in part on the aggregated information and the electronic device-to-electronic device connections, one or more first transition thresholds between nearest-neighbor electronic devices in the network and one or more second transition thresholds between next-nearest-neighbor electronic devices in the network;
    selecting a response threshold for whether to respond to a given probe request, a given authentication frame or a given management frame based at least in part on the one or more first transition thresholds;
    receiving, at the interface circuit, a probe request, an authentication frame or a management frame associated with a client, wherein the probe request, the authentication frame or the management frame is compatible with an Institute of Electrical and Electronics Engineers (IEEE) 802.11 communication protocol, wherein the management frame comprises an association request, and wherein the probe request, the authentication frame or the management frame is received before the electronic device is associated with the client; and
    selectively responding, based at least in part on the selected response threshold, to the probe request, the authentication frame or the management frame.

13. The non-transitory computer-readable storage medium of claim 12, wherein aggregating the information comprises:
    collecting the probe requests, client identifiers of the one or more clients associated with the probe requests, times of receipt of the probe requests, and signal strengths associated with the probe requests; and
    clustering or grouping the probe requests from the one or more clients based at least in part on the client identifiers and the times of receipt, wherein a given cluster comprises the probe requests associated with a given client identifier that were transmitted in a time interval.

14. The non-transitory computer-readable storage medium of claim 12, wherein the one or more operations comprise inferring a network topology of the network based at least in part on the electronic device-to-electronic device connections-, and signal strengths of different clusters of probe requests that were received across multiple channels by the electronic device and the one or more other electronic devices.

15. The non-transitory computer-readable storage medium of claim 12, wherein determining the electronic device-to-electronic device connections in the network comprises computing, based at least in part on the aggregated information, which of the electronic device and the one or more other electronic devices are neighbors to each other as seen from the perspective of a given client in the one or more clients in the network.

16. A method for selectively responding to a probe request, comprising:
    by an electronic device:
    exchanging, via an interface circuit in the electronic device, information that specifies probe requests with one or more other electronic devices in the network;
    aggregating information about the probe requests associated with one or more clients in a network;
    determining, based at least in part on the aggregated information, electronic device-to-electronic device connections in the network;
    calculating, based at least in part on the aggregated information and the electronic device-to-electronic device connections, one or more first transition thresholds between nearest-neighbor electronic devices in the network and one or more second transition thresholds between next-nearest-neighbor electronic devices in the network;
    selecting a response threshold for whether to respond to a given probe request, a given authentication frame or a given management frame based at least in part on the one or more first transition thresholds;
    receiving, at the interface circuit, the probe request, an authentication frame or a management frame associated with a client, wherein the probe request, the authentication frame or the management frame is compatible with an Institute of Electrical and Electronics Engineers (IEEE) 802.11 communication protocol, wherein the management frame comprises an association request, and wherein the probe request, the authentication frame or the management frame is received before the electronic device is associated with the client; and
    selectively responding, based at least in part on the selected response threshold, to the probe request, the authentication frame or the management frame.

17. The method of claim 16, wherein determining the electronic device-to-electronic device connections in the network comprises computing, based at least in part on the aggregated information, which of the electronic device and the one or more other electronic devices are neighbors to each other as seen from the perspective of a given client in the one or more clients in the network.

18. The method of claim 16, wherein the method comprises inferring a network topology of the network based at least in part on the electronic device-to-electronic device connections, and signal strengths of different clusters of probe requests that were received across multiple channels by the electronic device and the one or more other electronic devices.

19. The method of claim 16, wherein the response threshold comprises at least one of the one or more first transition thresholds or a combination of the one or more first transition thresholds.

20. The non-transitory computer-readable storage medium of claim 12, wherein the response threshold comprises at least one of the one or more first transition thresholds or a combination of the one or more first transition thresholds.

* * * * *